United States Patent
Torres Dho et al.

(10) Patent No.: US 12,542,793 B2
(45) Date of Patent: Feb. 3, 2026

(54) POINT-IN-TIME RELATIVE OUTLIER DETECTION

(71) Applicant: Oracle International Corporation, Redwood Shores, CA (US)

(72) Inventors: Diego Ceferino Torres Dho, Barcelona (ES); Chieh Ting Yeh, Austin, TX (US); Yufei Liu, San Jose, CA (US); May Bich Nhi Lam, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 244 days.

(21) Appl. No.: 18/063,869

(22) Filed: Dec. 9, 2022

(65) Prior Publication Data

US 2023/0319083 A1 Oct. 5, 2023

Related U.S. Application Data

(60) Provisional application No. 63/326,030, filed on Mar. 31, 2022.

(51) Int. Cl.
*H04L 9/40* (2022.01)
*G06N 20/10* (2019.01)
*G06N 20/20* (2019.01)

(52) U.S. Cl.
CPC ......... *H04L 63/1425* (2013.01); *G06N 20/10* (2019.01); *H04L 63/14* (2013.01)

(58) Field of Classification Search
CPC ..... H04L 63/1425; H04L 63/14; G06N 20/10; G06N 20/20
See application file for complete search history.

(56) References Cited

U.S. PATENT DOCUMENTS

| 11,853,853 B1 * | 12/2023 | Beauchesne | ........ H04L 63/1433 |
| 2017/0147930 A1 * | 5/2017 | Bellala | ..................... G06N 5/04 |

(Continued)

FOREIGN PATENT DOCUMENTS

| CN | 111507376 A | 8/2020 |
| CN | 107528722 B | 10/2020 |
| CN | 112529109 A | 3/2021 |

OTHER PUBLICATIONS

Amarbayasgalan et al.., "Unsupervised Anomaly Detection Approach for Time-Series in Multi-Domains Using Deep Reconstruction Error", Symmetry, 2020, vol. 12, 22 Pages.

(Continued)

*Primary Examiner* — Shirley X Zhang
(74) *Attorney, Agent, or Firm* — Invoke

(57) ABSTRACT

Techniques for performing point-in-time relative outlier detection are disclosed herein. In some embodiments, an outlier detection system analyzes metric data based on (a) the values of the metric data detected on a computing resource, (b) a relative change between different metric readings and/or (c) an absolute change between different metric readings relative to the point in time. The outlier detection system may predict whether the computing resource is exhibiting anomalous behavior by applying a set of machine-learning (ML) models to the point-in-time values. The ML models allow the outlook detection system to make inferences and adjustments during application runtime rather than relying on static instruction sets to detect and classify outliers. The ML models that are applied may implement unsupervised learning methods that do not rely on pre-training and/or time-series analysis for classification. Thus, the ML models may provide a point-in-time classification without requiring historical metric data to detect outliers.

20 Claims, 5 Drawing Sheets

(56) References Cited

U.S. PATENT DOCUMENTS

| | | | |
|---|---|---|---|
| 2018/0096261 A1 | 4/2018 | Chu et al. | |
| 2019/0362245 A1 | 11/2019 | Buda et al. | |
| 2021/0089927 A9 | 3/2021 | Ryan et al. | |
| 2022/0029902 A1* | 1/2022 | Shemer | G06F 21/57 |
| 2022/0138504 A1 | 5/2022 | Fathi Moghadam et al. | |
| 2023/0297453 A1* | 9/2023 | Viclizki | G06N 3/045 |
| | | | 714/47.2 |
| 2024/0146747 A1* | 5/2024 | Zaytsev | H04L 63/1416 |

OTHER PUBLICATIONS

Gupta et al., "Outlier Detection for Temporal Data: A Survey", IEEE Transactions on Knowledge and Data Engineering, vol. 25, No. 1, Jan. 2014, 20 Pages.

Zhao et al., XGBOD: Improving Supervised Outlier Detection with Unsupervised Representation Learning, 2019, 8 Pages.

* cited by examiner

POINT-IN-TIME RELATIVE OUTLIER DETECTION

INCORPORATION BY REFERENCE; DISCLAIMER

The following applications are hereby incorporated by reference: application No. 63/326,030 filed on Mar. 31, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to machine learning models and methods for detecting anomalous behavior in computing systems.

BACKGROUND

Many computing resources generate metric data to facilitate analysis of system behavior and diagnosis of detected problems. For example, a computing host may produce metrics at a sample interval rate tracking central processing unit (CPU) utilization, memory throughput, input/output (I/O) data rate, active user sessions, and average response latency, among other metrics. In some cases, the metric data is recorded in log files for subsequent analysis by system administrators or other users to investigate the root cause of problematic behavior.

Mining knowledge from log files and raw metric data is often challenging. In particular, the amount of raw data to analyze may be vast and difficult to interpret. As a result, identifying problematic behavior may be an inefficient, time-consuming, and error-prone process, especially when patterns of interest are relatively sparse in occurrence. However, early detection of problematic behavior may prevent or mitigate potentially severe issues, such as slow system response times, system outages, and other symptoms that degrade system performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
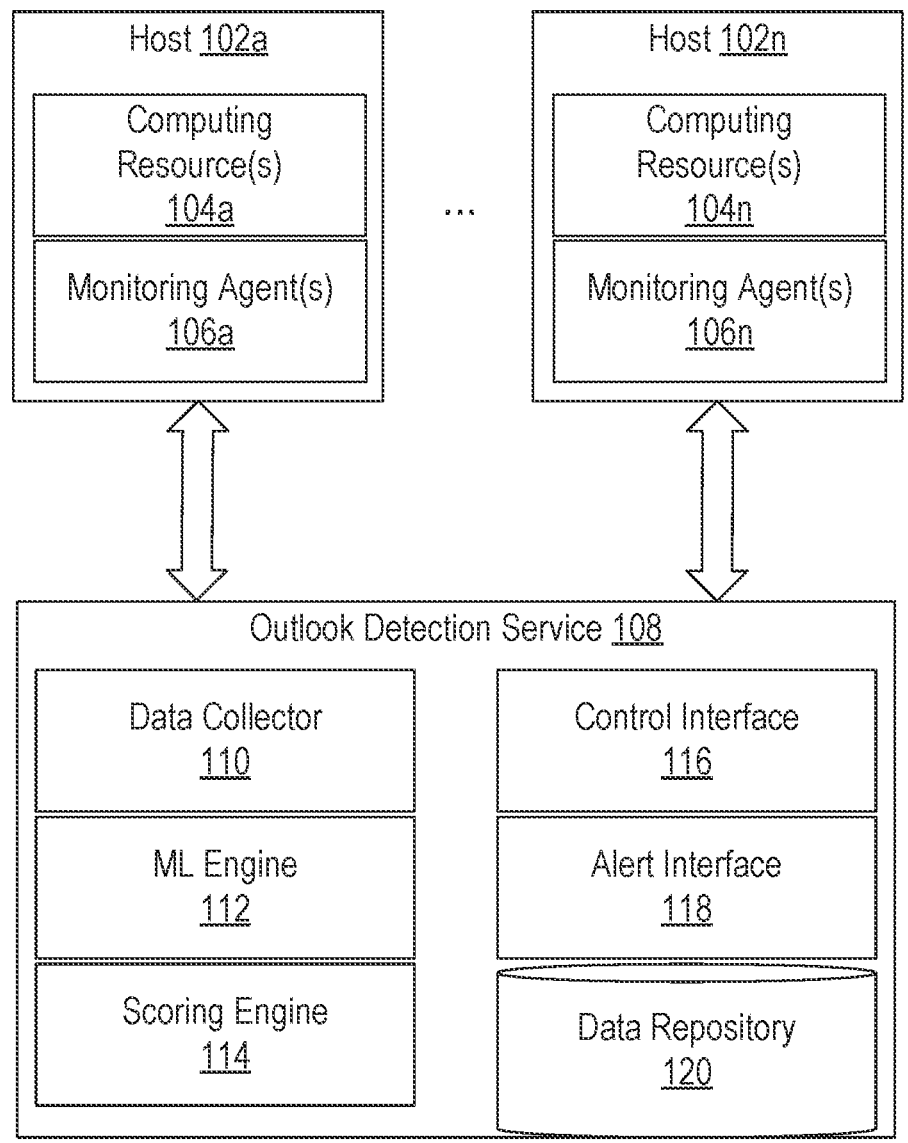
FIG. 1 illustrates a system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for performing point-in-time outlier detection on metric data. The techniques may be deployed in large-scale computing environments that include several computing resources, such as cloud or data-center environments comprising multiple network hosts in various geographic locations. The techniques may provide early detection of anomalous behavior, allowing for responsive actions to quickly target the root cause of any underlying problems. Early detection may help prevent issues from cascading and growing into more severe problems that cause significant system degradation or outages.

In some embodiments, an outlier detection system analyzes metric data based on (a) the values of the metric data detected on a computing resource at a particular point in time, (b) a relative change between two consecutive metric readings from a computing resource, and/or (c) an absolute change between the two consecutive metric readings. The metric value readings and change values for a computing resource are also referred to as "point-in-time" values as the system may identify or compute the values at various points in time, such as at the point in time a most recent sample was taken. The outlier detection system may predict whether the computing resource is exhibiting anomalous behavior at a given point in time by applying a set of one or more machine-learning (ML) models to the point-in-time values. The ML models allow the outlook detection system to make inferences and adjustments during application runtime rather than relying on static instruction sets to detect and classify outliers. In particular, the outlook detection system may learn point-in-time values during runtime that are anomalous rather than relying on fixed, predetermined thresholds. A set of point-in-time values that are anomalous in one context may not be anomalous in another context. Thus, the outlook detection system may adapt in real-time to varying and evolving behavior without requiring additional hard-coding to account for new patterns.

In some embodiments, the outlier detection system applies an ensemble of ML models to the point-in-time values. The ensemble may include different ML models that produce independent predictions of whether the point-in-time values represent outlier behavior. The outlier detection system may average or otherwise aggregate the resulting predictions from the different ML models to classify the behavior of the computing resource. The application of an ensemble of ML models may improve the robustness of the overall ML system, as different models may classify patterns differently based on unique learning processes. The ML models that are applied may implement unsupervised learning methods that do not rely on pre-training and/or time-series analysis for classification. Thus, the ML models may provide a point-in-time classification without requiring historical metric data to detect outliers in real-time.

In some embodiments, the outlier detection system generates one or more anomaly scores for each host based on the output of the one or more ML models. To generate an outlier detection score for a set of hosts, the outlier detection system may receive, as input from each respective host, a set of point-in-time values tracking one or more metrics associated with the respective host. The outlier detection system may then apply the set of one or more ML models and, if more than one ML model has been applied, aggregate the outputs of the models to generate the host scores. The anomaly scores for a given host may include (a) an anomaly score based on one or more point-in-time (e.g., the most recent) absolute metric values measured on the host, (b) an anomaly score for changes in the point-in-time metric value(s) relative to previously measured value(s) on the host, (c) an anomaly score for the absolute changes between the point-in-time metric value(s) relative to the previously measured value(s), and/or (d) an overall anomaly score for the host, which may be an aggregate of one or more of the other anomaly scores.

In some embodiments, the outlier detection system triggers one or more actions based on the host anomaly scores. Example actions may include generating an alert to notify a system administrator of anomalous activity, sorting a list of hosts within a pipeline to prioritize maintenance operations on anomalous machines, redirecting requests away from hosts exhibiting anomalous behavior to non-anomalous hosts, and applying patches to anomalous hosts. Additionally or alternatively, the anomaly scores may be consumed by other applications, such as root cause and diagnostic applications, which may execute additional analytics and/or actions.

One or more embodiments described in this Specification and/or recited in the claims may not be included in this General Overview section.

2. Architectural Overview

FIG. 1 illustrates a system 100 in accordance with some embodiments. As illustrated in FIG. 1, system 100 includes hosts 102a-n and outlier detection service 108. In one or more embodiments, system 100 may include more or fewer components than the components illustrated in FIG. 1. The components illustrated in FIG. 1 may be local to or remote from each other. The components of outlier detection service 108 may be distributed over multiple applications and/or machines. Multiple components may be combined into one application and/or machine. Operations described with respect to one component may instead be performed by another component.

In some embodiments, hosts 102a-n are computing devices that are connected to a computer network. A computing device generally refers to any hardware device that includes a processor. A computing device may refer to a physical device executing an application or a virtual machine. Examples computing devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In some embodiments, each of hosts 102a-n are associated with respective set of computing resources (e.g., host 102a is associated with computing resources 104a and host 102n is associated with computing resources 104n). Computing resources may comprise software and/or hardware resources used in the execution of one or more applications by the associated host. Example computing resources may include central processing units (CPUs), network ports, database connections, user sessions, memory, operating systems, application instances, and virtual machine instances. Additionally or alternatively, a host may include other computing resources, which may vary from one host to the next.

In some embodiments, a set of monitoring agents 106a-n are deployed on each host to generate metric data for the computing resources. A monitoring agent may be a background process, such as a daemon, that executes on the corresponding host machine and generates information about the targets that are installed on the machine. Additionally or alternatively, a monitoring agent may comprise one or more sensors, which may measure and provide readings of metric data. Example metric readings may include CPU utilization rates, CPU temperature, memory utilizations rates, memory throughput, network port utilization rate, number of open network ports, number of active user sessions, number of database connections, average request response times, and input/output (I/O) data rates. Additionally or alternatively, other metrics may be collected depending on the particular implementation. Monitoring agents 106a-n may provide readings at a sample interval, such as every five minutes or at some other rate, which may be exposed to and configurable by an end user.

In some embodiments, the same metrics are collected from each host. In other embodiments, different metrics may be collected for different hosts. In the latter case, the metrics may vary by host type, with different sets of metrics collected for different types of hosts. For example, different metrics may be collected for web servers, application servers, database servers, and load balances at different tiers of a multi-tier application. Thus, the metrics that are collected and used to compute outlier/anomaly scores may vary depending on the particular implementation.

In some embodiments, monitoring agents 106a-n may include trace and/or log providers that generate trace and/or other log data for the hosts. A log file may document one or more metric readings for a resource at a sample time. Additionally or alternatively, a log file may include one or more event records for the metric readings that include a time of occurrence of a metric reading and the metric values observed at the corresponding timestamp.

Although only one monitoring agent is illustrated per host, multiple monitoring agents may be deployed on each host to monitor different computing resources on the host. For example, different monitoring agents may be deployed to monitor CPU utilization metrics, network port metrics, application metrics, operating system metrics, etc. Additionally or alternatively, one or more monitoring agents may remotely collect metrics from multiple hosts.

Outlier detection service 108 includes a set of components for performing unsupervised detection of anomalous behavior on hosts 102a-n. In some embodiments, outlier detection service 108 includes data collector 110, machine-learning (ML) engine 112, scoring engine 114, control interface 116, alert interface 118, and data repository 120. As previously indicated, the components illustrated in FIG. 1, including outlier detection service 108, may vary from implementation to implementation.

Data collector 110 aggregates metric data generated by monitoring agents 106a-n on hosts 102a-n. Data collector 110 may gather log files, trace records, metric readings, and/or other sources of metric data in real-time as the data are generated on a streaming basis, periodically in batches, or on demand. Data collector 110 may aggregate the collected metric data in one or more monitoring files. For example, data collector 110 may generate a different monitoring file for each host. Additionally or alternatively, data collector 110 may form data frames from the metric values as described further herein.

ML engine 112 applies one or more ML models to point-in-time values extracted from or generated based on the metric data to estimate whether each host's behavior is an outlier. In some embodiments, ML engine 112 implements an ensemble of machine learning algorithms that iterates over an input set of data to generate a target model f for mapping the set of input variables to an output variable. The input variables may include point-in-time values where a point-in-time value represents a quantifiable metric that is relevant to a particular point in time. The point-in-time values may be mapped, using ML processes, to an output variable including a classification and/or probability indicating a likelihood that the host's behavior is an outlier.

In some embodiments, scoring engine 114 aggregates the outputs of one or more ML models to generate an anomaly score for the host. For example, scoring engine 114 may average the number of ML models that have classified a host's behavior as an outlier and/or the estimated probabilities associated with the output variables. Scoring engine may generate a single anomaly score per host or multiple anomaly scores per host for a given point in time. Examples for computing outlier/anomaly scores are described further below.

Control interface 116 includes hardware and/or software through which outlier detection system 100 interacts with users and/or applications. Control interface 116 may render interface elements and receive input via interface elements. For example, users and/or applications may define parameters for detecting outliers, submit queries on metric/outlier data, view/navigate report data, and/or otherwise interact with one or more components of system 100. Example interfaces include a graphical user interface (GUI), a command line interface (CLI), a haptic interface, and a voice command interface, and an application programming interface (API). Examples user interface elements include checkboxes, radio buttons, dropdown lists, list boxes, buttons, toggles, text fields, date and time selectors, command lines, sliders, pages, and forms.

Report interface 118 includes hardware and/or software for generating reports and/or triggering alerts based on the outlier detection scores. In some embodiments, administrators may register via report interface 118 to receive alert notifications and/or outlier detection reports. Administrators may input contact information such as an email address, short message service (SMS) number, and/or social media handle. Report interface 114 may allow different administrators to register for different types of alerts. For instance, database administrators may register to receive alerts stemming from database hosts, network administrators may register for alerts stemming from web hosts, and application administrators may register for alerts stemming from application hosts. When abnormal pattern behavior is detected, report interface 118 may determine which administrators to notify and the communication channel to use (e.g., email, SMS message, social media post) based on the registration data.

Data repository 120 stores data, such as metric values, ML model hyperparameters, anomaly scores, registration data, and/or outlier detection reports. Data repository 120 may be any type of storage unit and/or device (e.g., a file system, database, collection of tables, or any other storage mechanism) for storing the pattern registration data. Further, data repository 120 may include multiple different storage units and/or devices. The multiple different storage units and/or devices may or may not be of the same type or located at the same physical site. Further, data repository 120 may be implemented or executed on the same computing system as one or more other components of outlier detection service 108. Alternatively or additionally, data repository 120 may be implemented or executed on a computing system separate from one or more other components of outlier detection service 108. When remotely implemented, data repository 120 may be communicatively coupled to via a direct connection or via a network.

In some embodiments, one or more components of system 100, including outlier detection service 108, may implemented as or integrated into a cloud service, such as a software-as-a-service (SaaS) or a platform-as-a-service (PaaS). Additional embodiments and examples pertaining to cloud services are described below in Section 5, titled Computer Networks and Cloud Networks.

3. Point-In-Time Outlier Scoring Using Machine Learning

In some embodiments, an ensemble of ML models are applied to point-in-time values to identify anomalous behavior on one or more computing hosts. As previously noted, a point-in-time value may represent a quantifiable metric that is relevant to a given point in time. In some cases, a point-in-time value may correspond to an observed metric at a particular sample time, such as the most recently measured CPU utilization rate on a host. In other cases, a point-in-time value may be a computed value that is derived from metrics observed at different times. For example, the point-in-time value may be computed based on a change in an observed metric at a particular point in time from the previous sample taken at a previous point in time. Additionally or alternatively, a point-in-time value may be determined in other ways, such as predicting the value through a forecasting model or receiving a simulated set of values from a hypothetical scenario.

In some embodiments, the ensemble of ML models may be applied to point-in-time values without requiring any pre-training on historical values. With pre-training, training datasets are used to learn signals from which to extrapolate before the ML models are applied. Pre-training is often computationally expensive and may be difficult to apply in certain streaming applications. The ML processes and models applied from the ensemble may avoid pre-training by learning and extrapolating from signals within the point-in-time values spanning several different hosts. Without requiring pre-training, the process of performing outlier detection using the ML models becomes more flexible as it may be applied at any time without having to wait for enough historical data to be accumulated to train the ML models. Further, the computational overhead may be much lower, allowing from a more streamlined and scalable approach.

Figure 2:
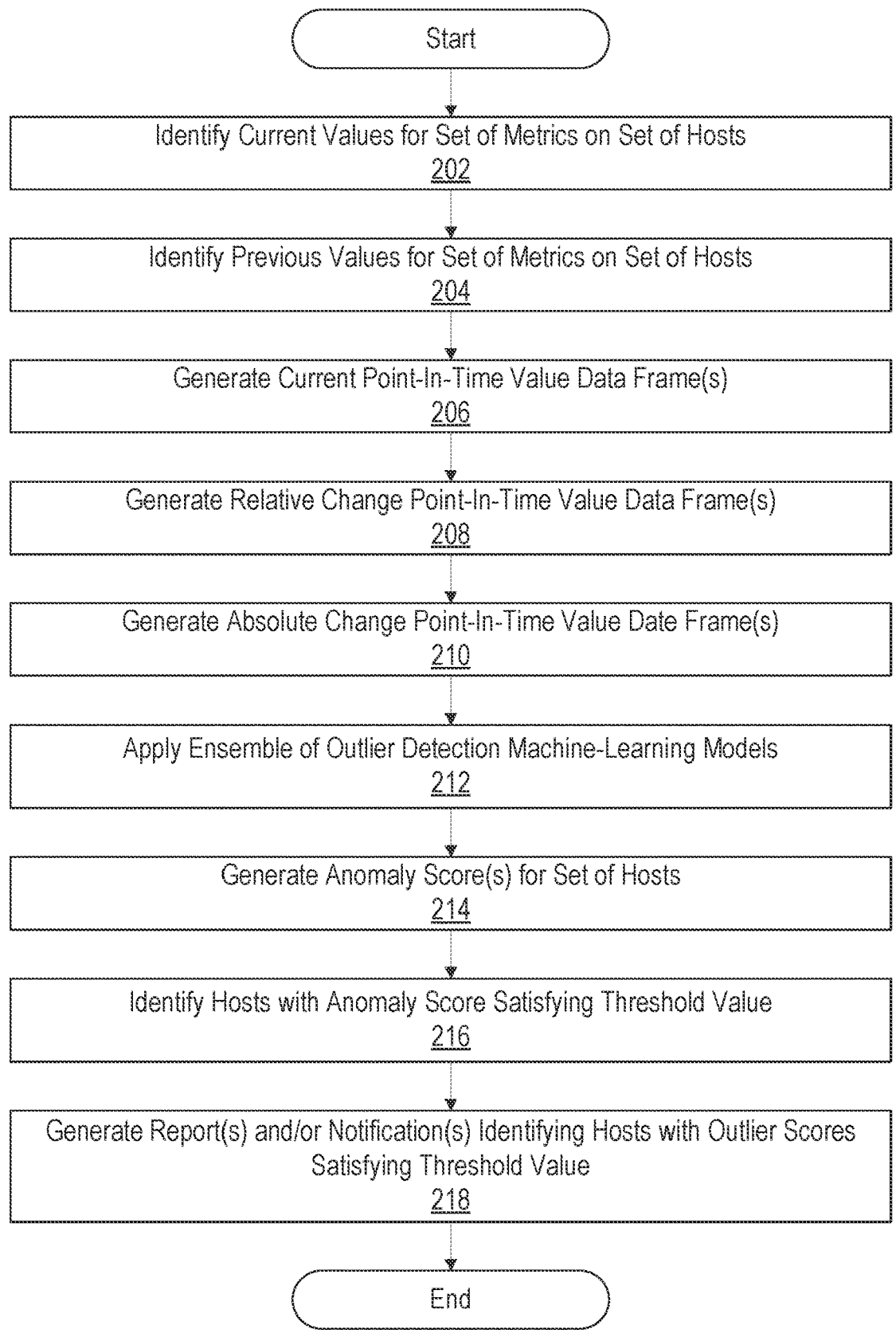
FIG. 2 illustrates an example set of operations for performing point-in-time outlier scoring in accordance with some embodiments.

FIG. 2 illustrates an example set of operations for performing point-in-time outlier scoring in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, at operation 202, the process identifies current values for a set of metrics from a set of hosts. For example, the process may scan log files received from hosts 102a-n for entries with the most recent timestamp. As another example, the process may detect and record the most recent samples streamed from hosts 102a-n. As previously mentioned, the set of metrics that are identified may vary from implementation to implementation.

At operation 204, the process identifies a previous value for the set of metrics from the set of hosts. In some embodiments, the previous value is the last available sample value from the current value such that there are no available samples between current sample and the last sample for the metric. For example, if the sample interval is five minutes, then the process may identify the sample from five minutes earlier. In other embodiments, the process may select previous samples other than the last available sample. A time window or horizon may be defined, and the process may select the earliest prior sample value within the time window. In other embodiments, multiple sample values may be extracted and used instead of a single prior value. For instance, two or more prior sample values may be identified and averaged together to smooth the data over a rolling window.

At operation 206, the process generates a set of one or more current point-in-time value data frames. A data frame is a data structure, which may be implemented as a table or multidimensional array for storing the point-in-time values. With current point-in-time value data frames, a column in the data structure may correspond to different metrics, such as CPU utilization rates, memory throughput, active user sessions, etc. Each row may correspond to a vector for a different host and include the most recent sample values detected on the host (the most current reading for the metrics on the host).

At operation 208, the process generates a set of one or more relative change point-in-time value data frames. With relative point-in-time value data frames, each column may correspond to a relationship between the current value and previous value for different metrics, and each row may correspond to the values of a relative changes for the different metrics on a given host. The process may compute the relative change values based on a ratio between the current value and the previous value. For example, if the current CPU utilization rate is 60% and the previous CPU utilization rate is 30%, then the process may compute relative change for the metric by dividing the current metric value from the previous value (2) or computing the percentage change in the value (100% or 1). The process may iterate through each metric value pair (current value, previous value) on each host to compute the relative change point-in-time values.

At operation 210, the process generates a set of one or more absolute change point-in-time value data frames. With absolute change point-in-time value data frames, each column may correspond to an absolute difference between the current value and previous value for different metrics, and each row may correspond to the values of the absolute changes for the different metrics on a given host. The process may compute the absolute change values based on the absolute difference between the current value and the previous value. For example, if the current CPU utilization rate is 60% and the previous CPU utilization rate is 30%, then the process may compute absolute change for the metric by subtracting the current metric value from the previous value (30%).

At operation 212, the process applies a set of outlier detection ML models to each data frame. In some embodiments, the ML models that are applied comprise models that (a) are not pre-trained and (b) use unsupervised learning to classify outlier values. Example ML algorithms/models include angle-based outlier detection (ABOD), clustering models (e.g., k-means clustering, k-mode clustering), k-nearest neighbors (KNN), principal component analysis (PCA), and support vector machines (SVM). The ML models may operate on the data frames to classify outliers without requiring any additional historical values/time-series data, providing a point-in-time analysis. The ML model may classify the behavior of a host as an outlier or non-outlier based on the set of point-in-time values for the host relative to patterns in point-in-time values for other hosts.

In some embodiments, each of the applied ML models outputs a per-host value or score for each data frame that indicates a classification and/or probability that the host's behavior is an outlier. With binary classification models, for instance, a 1 may indicate the behavior was classified as an outlier, and a 0 may indicate the behavior was classified as a non-outlier. Probabilistic models may assign values between 0-1 based on the probability that the value is an outlier with 1 indicating a 100% probability, 0 indicating a 0% percent probability, and values in between represent varying levels of probability increasing the closer the value is to 1.

At operation 214, the process generates a set of anomaly scores for each host based on the output of the machine learning algorithms. In some embodiments, the process averages the values output for a given host by each model to compute a "mean anomaly score" for the host. For example, the process may sum the values for the given host and divide by the total number of models that were applied to the data frame.

In other embodiments, other aggregation functions may be used to compute the anomaly score. As another example, the score may be computed as a weighted sum, where the output of different models are weighted differently and summed together. The weight may correspond to the contribution of the model to the score, where ML model outputs weighted more highly contribute more to than ML model outputs with lower weights. Weighting may be set based on model reliability, user input customizing the ML model application, and/or other factors. In other cases, each ML model output may be given equal weight. In yet another example, the median output value may be selected and used as the score. Thus, the manner in which the scores are computed and normalized may vary from implementation to implementation.

In some embodiments, the process computes multiple anomaly scores for each host. For example, the process may compute a separate per-host anomaly score for each of the data frames previously mentioned. Additionally or alternatively, the process may compute an overall anomaly score by aggregating (e.g., averaging or summing) the anomaly scores for each data frame. Thus, the set of anomaly scores for a given host may include: (a) a score for the current reading/absolute value of the sample set of metrics observed on the host at a given point in time based on the probability that the host's behavior is an outlier; (b) a score for changes in the sample set of metrics at the given point in time relative to previously measured value(s) on the host indicating that the overall relative change in the set of metrics is an outlier;

(c) a score for the absolute changes between the point-in-time metric value(s) relative to the previously measured value(s) indicating that the magnitude of the change in the set of metrics is an outlier, and/or (d) an aggregate outlier score for the host based on an aggregation of two or more of previously mentioned scores.

At operation 216, the process determines whether any hosts have an anomaly score satisfying a threshold value. For example, the process may determine whether the metric outlier score, relative outlier score, absolute outlier score, and/or aggregate outlier score for a host are above one or more thresholds. The thresholds for the different scores/data frames may vary or be the same depending on the particular implementation. Additionally or alternatively, the threshold values may be configurable by an end user At operation 218, the process generates a report or notification identifying the hosts with anomaly scores that satisfy the threshold value. The report may include entries for each host satisfying the threshold. The entries may include information about the host, including a hostname, internet protocol (IP) address, outlier score value, point-in-time values, and/or metric values. In some embodiments, different reports may be generated for each different type of data frame. For example, a relative change report may identify hosts with outlier relative metric changes, an absolute change report may identify hosts with outlier absolute metric changes, and a current metric report may identify hosts with current metric values that are outliers.

Figure 3:
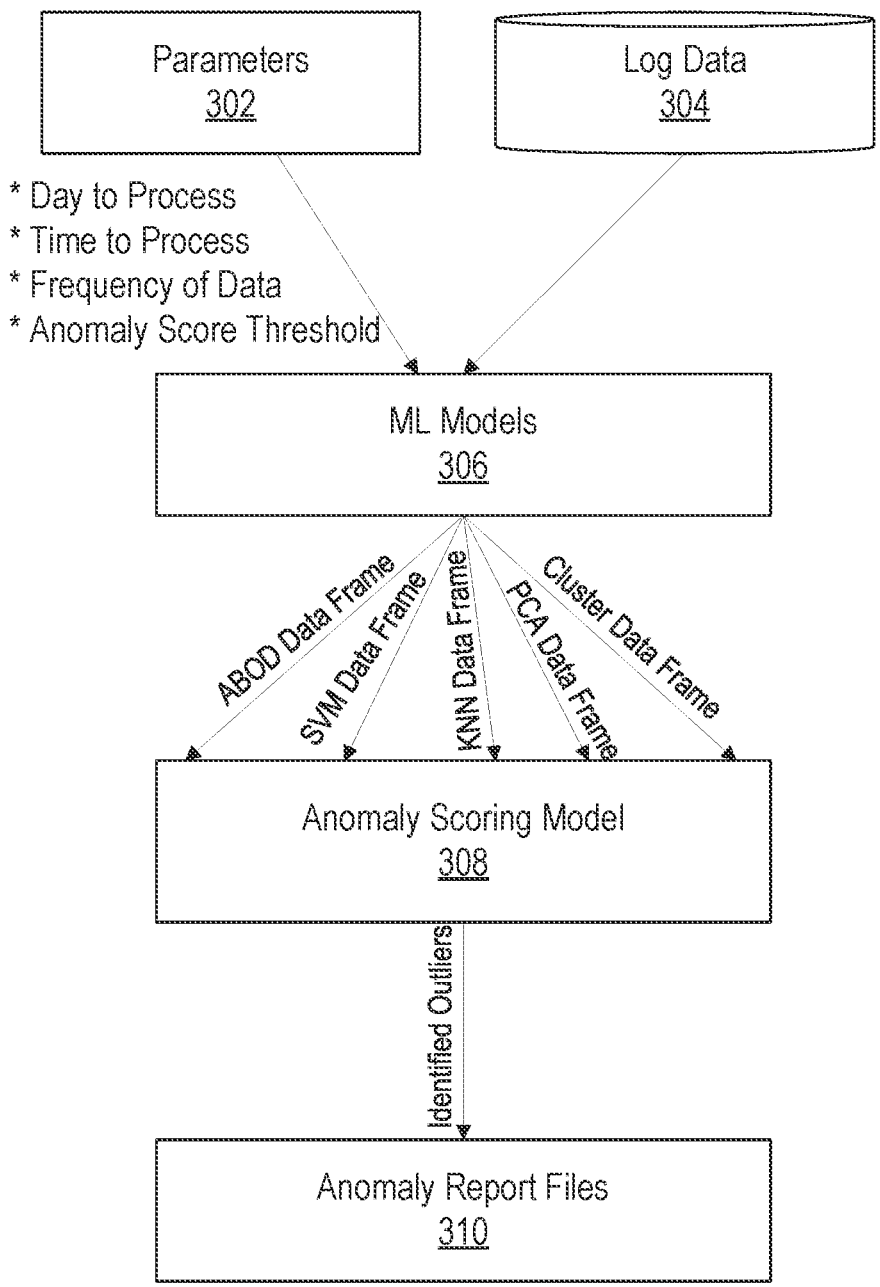
FIG. 3 illustrates an example process diagram for detecting anomalous host behavior in accordance with some embodiments.

FIG. 3 illustrates an example process diagram for detecting anomalous host behavior in accordance with some embodiments. Referring to FIG. 3, ML algorithms 306 receive parameters 302 and log data 304. Parameters 302 control various aspects of how outlier detection is performed including the day and time to run outlier detection, the sampling frequency of the data, and an outlier score threshold for triggering alerts/action with respect to a host. One or more of the parameters may be configured by an end user. If the user has not selected a value for a parameter, then the system may use a default value.

ML algorithms 306 may generate current, relative, and/or absolute data frames by extracting the current and/or previous values from log data 304. In the example depicted, ML algorithms 306 that are applied include ABOD, clustering, KNN, PCA, and SVM. Additionally or alternatively, other ML models may be applied to each data frame. In some embodiments, parameters 302 may specify a parameter fraction (e.g., 0.5%) that indicates the percentage of data expected to be outliers. The ML models may use the parameter fraction to cap the maximum number of outliers detected at a given point in time.

For each data frame, all of ML algorithms 306 are run to estimate a classification or probabilistic value. With ABOD, for instance, the process may identify outliers based on the variances of the angles and distances between data points within a data frame. Smaller angles and larger distances are indicative of angles. The ML algorithm may learn the angle/distance thresholds (a fixed threshold is not set) to classify a host as an outlier or non-outlier. With clustering, outliers may be detected based on the distance between the host (represented by the host's point-in-time values) at a point in time and the nearest cluster centroid. With KNN, outliers may be detected based on the distance between the host and the k nearest neighbors. With PCA, outliers may be detected based on a decomposition (e.g., an eigendecomposition) of the values into principal components and variance between the host's principal components from the principal components of other hosts. With SVM, outliers may be detected based on the position of a host relative to a hyperplane or boundary.

Anomaly scoring model 308 receives the model outputs for each data frame and averages the values for each host to compute the hosts mean anomaly score. Anomaly scoring model 308 compares the score to the outlier score threshold to determine whether to classify the host's behavior as an outlier. Anomaly scoring model 308 generates anomaly report files 310 that identifies hosts that satisfy the threshold.

4. Score-Based Analytics and Actions

In some embodiments, outlier detection system 108 may trigger one or more actions based on the outlier/anomaly scores. For example, outlier detection system 108 may redirect requests away from hosts with anomaly scores above a threshold until the anomaly scores drop below the threshold. As another example, outlier detection system 108 may search for patches and/or configuration settings that are recommended for the host and have not yet been applied. Outlier detection system 108 may then apply the patch or recommended configuration setting or notify an administrator of the recommendations. As another example, outlier detection system 108 may sort or populate a queue for performing maintenance operations. Hosts with the highest anomaly scores may rise to the top of the queue to prioritize maintenance operations on those hosts while hosts with lower anomaly scores may reside lower in the queue.

In some embodiments, different actions may be defined as a function of different types of anomaly scores for a given host. For example, one or more of the above actions may be triggered only if both the relative and absolute anomaly scores are above a threshold. Thus, if only one of the scores is above the threshold, the action is not automatically executed. As another example, one or more of the above actions may be triggered if a particular type of anomaly score (e.g., relative, absolute) is above a threshold, but not if it is below the threshold, regardless of whether or not the other anomaly score(s) for the host are above the threshold.

Additionally or alternatively, the anomaly scores may be consumed by other applications. While the above techniques allow for outlier detection without relying on time-series data, an application may construct a time-series of point-in-time outlier scores to perform time-series analytics on the host behavior, such as forecasting, baselining, and seasonal modeling. For example, a time-series for a particular host may comprise the outlier scores at different sample times. The time-series dataset may be fed as input into a forecasting model to project anomaly scores for the host in the future, a baselining model to detect changes in the baseline to anomaly scores generated for a given host, or a seasonality model to detect seasonal patterns within the anomaly scores for the host.

While pre-training is not required for the anomaly scoring and outlier detection model described above, pre-training may be implemented for downstream models that consume the anomaly scores. For example, a training dataset may be used to train a forecasting model, baselining model, and/or seasonality model before it is applied to a new set of anomaly scores. The training process may use a machine learning algorithm, which is an algorithm that can be iterated to learn a target model f that best maps a set of input variables to an output variable, using a set of training data. The training data may include example anomaly scores and associated labels (e.g., forecast results, seasonal classifications, and/or other classifiers). The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

Once trained, the target model f may be applied to new datasets that have not previously been seen and were not included in the training dataset to estimate new labels. For example, a new set of sample anomaly scores may be fed as input to the target model f, which may then generate a label representing a predicted forecast for one or more subsequent anomaly scores in a time-series. In other cases, the label may represent a predicted classifier, such as label indicating whether a sequence of anomaly scores is predicted to be problematic, unexpected, normal, or some other classification.

In some embodiments, the anomaly scores may be used to detect anomalies in real-time or near real-time by streaming log data. For example, log data may be streamed from hosts 102a-n to outlook detection service 108, which may process the log data to compute the anomaly scores for the most recent point-in-time values contained within the log records. Outlook detection service 108 may flag hosts exhibiting anomalous behavior, generating alerts and/or triggering actions on these hosts to provide early warning and mitigation of problematic behavior.

Figure 4:
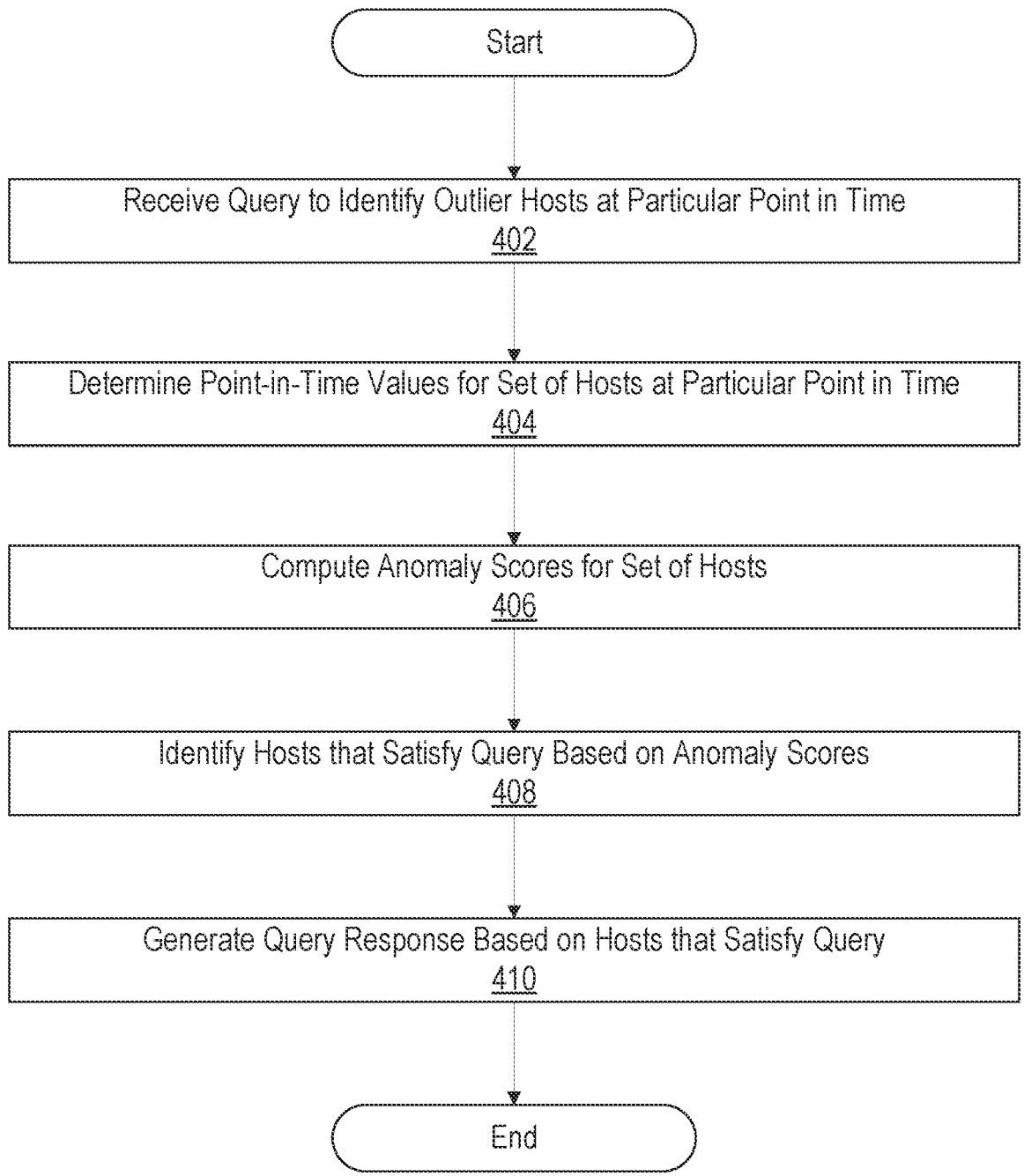
FIG. 4 illustrates an example set of operations for processing queries directed to identifying outlier hosts in accordance with some embodiments.

Additionally or alternatively, the processes above may be used to compute outliers at historical points in time. FIG. 4 illustrates an example set of operations for processing queries directed to identifying outlier hosts in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

At operation 402, the process receives a query to identify outlier hosts at a particular point in time. The query may explicitly specify the point in time to detect outliers. For example, a user may query the system for which hosts were acting anomalous last Friday at 5 p.m. to analyze the system behavior at this time. In other cases, the time may be inferred if not specified in the query. For instance, it may be inferred that the query should be run on the most recent log data collected if a time is not specified.

At operation 404, the process determines point-in-time values for the set of hosts at the particular point in time. For example, the process may identify the closest sample values within log records at the specified time in the query. If a time is not specified, then the process may extract the most recent samples captured on the host. The process may further identify the previous metric value readings to derive the relative and/or absolute change point-in-time values as previously described.

At operation 406, the process computes a set of anomaly scores for the set of hosts. For example, the process may generate data frames and apply the ensemble of ML models as described in the previous section to compute a set of one or more anomaly scores per host.

At operation 408, the process identifies hosts that satisfy the query based on the anomaly scores. For example, the process may identify hosts with anomaly scores that exceed a threshold value. In other cases, the process may identify the top n hosts or top n % of hosts with the highest anomaly scores. The criteria may be explicitly specified in the query (e.g., "Identify the top n most anomalous hosts last Saturday evening"), inferred through natural language processing, or selected by the process based on predefined rules.

At operation 410, the process generates a query response based on the set of hosts that satisfy the query. The response may include information identifying which subset of hosts satisfy the query (e.g., the top n hosts with the highest anomaly scores or hosts with scores above a threshold). For example, the information may identify the subset of hosts by hostname, IP address, and/or other host identifiers. The query may further include other information about the hosts including the anomalous metric values, relative changes, absolute changes, aggregate behavior, configuration settings, hardware platform, operating system information, installed applications, geographic location, and/or other host attributes that may be helpful to user submitting the query.

In some embodiments, the process may further present interactive visualizations to facilitate analysis and management operations on a host. For example, a user may submit the query through a web application interface, which may generate, render, and display charts, graphs, and other visualizations of the anomaly scores on the hosts. The user may select on icons and/or other graphical representations of a host to drill-down and view more information regarding the host. The interface may present available actions that may be deployed to remotely manage the host. Example actions may include restarting a host, shutting down a host, applying a patch, redirecting traffic to a different host, backing up a host, and/or changing other host configuration settings.

The user may browse and select available actions through the interface to trigger the remote management operations. In response to a selection, the web application may submit remote management commands, such as using the Simple Network Management Protocol (SNMP) and/or other communication protocols of the Internet Protocol (IP) Suite, to trigger operations on the targeted host. Thus, operations may be remotely triggered and executed to address anomalous host behavior.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
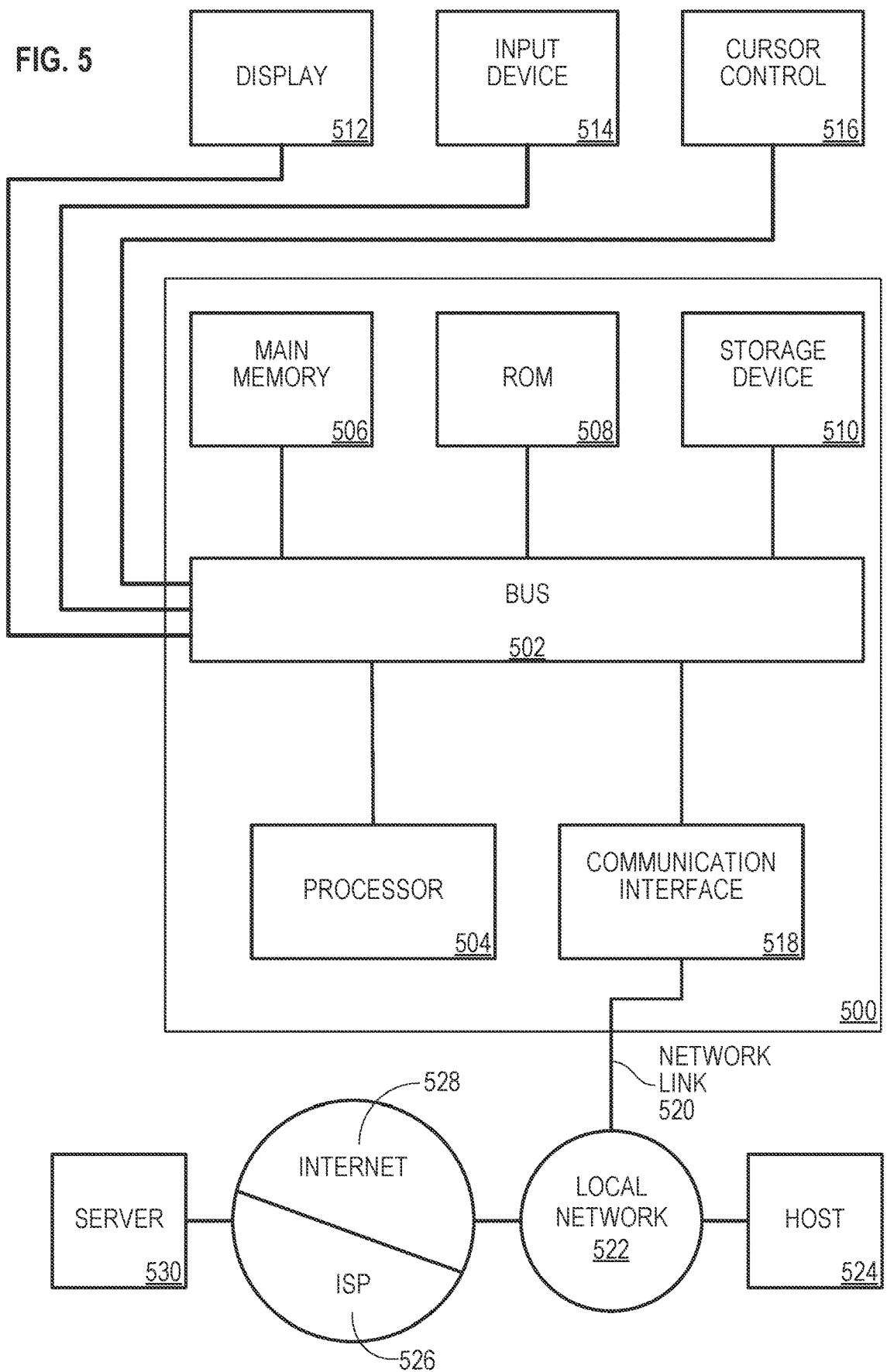
FIG. 5 illustrates a computer system upon which some embodiments may be implemented.

For example, FIG. 5 illustrates a computer system upon which some embodiments may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP)

526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable storage media storing instructions, which when executed by one or more hardware processors, cause:
    generating a set of data frames based on metric values associated with a plurality of hosts detected at a particular point in time, wherein generating the set of data frames comprises generating a first data frame that captures relative changes in different metric values between the particular point in time and a previous point in time for at least a first host of the plurality of hosts and a second data frame that captures absolute changes in the different metric values between the particular point in time and the previous point in time for at least the first host of the plurality of hosts;
    applying a plurality of machine learning models that have not been pre-trained from historical data to the set of data frames, including the first data frame and the second data frame, to generate, for at least the first host of the plurality of hosts based on the first data frame and the second data frame, a plurality of estimates that the first host is an outlier relative to other hosts in the plurality of hosts, wherein applying the plurality of machine learning models includes generating a plurality of output values for each data frame including at least a first set of output values generated by applying two or more machine learning models to the first data frame and a second set of output values generated by applying the two or more machine learning models to the second data frame, wherein the two or more machine learning models include different types of machine learning models;
    generating, based on the plurality of estimates for the first host of the plurality of hosts, a score representing a likelihood that the first host is exhibiting anomalous behavior, wherein generating the score includes (a) computing a first aggregate value by aggregating the first set of output values generated by applying the two or more machine learning models to the first data frame, (b) computing a second aggregate value by aggregating the second set of output values generated by applying the two or more machine learning models to the second data frame, and (c) computing the score by aggregating at least the first aggregate value and the second aggregate value; and
    performing one or more actions based on the score.

2. The media of claim 1, wherein the plurality of output values include a first score that indicates a likelihood that relative changes in the metric values on the first host are anomalous and a second score that indicates a likelihood that absolute changes in the metric values on the first host are anomalous; wherein the one or more actions are triggered based on at least one of the first score or the second score.

3. The media of claim 1, wherein the instructions further cause: comparing the score to a threshold value; determining that the score satisfies the threshold value; wherein the one or more actions are triggered responsive to determining that the score satisfies the threshold value.

4. The media of claim 1, wherein generating the score comprises averaging the plurality of estimates for the first host.

5. The media of claim 1, wherein applying the plurality of machine learning models generates a second plurality of estimates for a second host of the plurality of hosts, wherein the instructions further cause: generating, based on the second plurality of estimates for the second host of the plurality of hosts, a second score representing a second likelihood that the second host is exhibiting anomalous behavior; wherein the one or more actions are further performed based on the second score.

6. The media of claim 1, wherein performing the one or more actions comprises generating a set of one or more reports that identify which of the plurality of hosts are exhibiting anomalous behavior at the particular point in time.

7. The media of claim 6, wherein the set of one or more reports include a first report that identifies which of the plurality of hosts have relative changes in behavior that is anomalous and a second report that identifies which of the plurality of hosts have absolute changes that are anomalous at the particular point in time; wherein the second report includes at least one host that is not included in the first report.

8. The media of claim 1, wherein performing the one or more actions comprises executing one or more maintenance operations on the first host.

9. The media of claim 1, wherein the plurality of machine learning models includes an angle-based outlier detection model.

10. The media of claim 1, wherein the plurality of machine learning models includes a clustering model.

11. The media of claim 1, wherein the plurality of machine learning models includes a nearest neighbor model.

12. The media of claim 1, wherein the plurality of machine learning models includes a principal component analysis model.

13. The media of claim 1, wherein the plurality of machine learning models includes a support vector machine.

14. The media of claim 1, wherein the plurality of machine learning models includes two or more of an angle-based outlier detection model, a clustering model, a nearest neighbor model, a principal component analysis model, or a support vector machine.

15. The media of claim 1, wherein the plurality of machine learning models includes two or more of an angle-based outlier detection model, a clustering model, a nearest neighbor model, a principal component analysis model, or a support vector machine.

16. The media of claim 1, wherein the set of data frames are generated responsive to receiving a query; wherein the particular point in time is determined based on the query; wherein the one or more actions includes generating a response to the query that identifies a subset of the plurality of hosts that satisfy the query.

17. The method of claim 1, wherein the first data frame includes a first set of rows corresponding to different hosts of the plurality of hosts and a first set of columns corresponding to different metrics for which the relative changes are captured for each of the different hosts, wherein the second data frame includes a second set of rows corresponding to the different hosts of the plurality of hosts and a second set of columns corresponding to different metrics for which the absolute changes are captured for each of the different hosts.

18. The method of claim 17, wherein each row in the first set of rows represents a vector for a corresponding host.

19. A system comprising:
one or more hardware processors;
one or more non-transitory computer-readable storage media storing instructions, which when executed by the one or more hardware processors, cause:
generating a set of data frames based on metric values associated with a plurality of hosts detected at a particular point in time, wherein generating the set of data frames comprises generating a first data frame that captures relative changes in different metric values between the particular point in time and a previous point in time for at least a first host of the plurality of hosts and a second data frame that captures absolute changes in the different metric values between the particular point in time and the previous point in time for at least the first host of the plurality of hosts;
applying a plurality of machine learning models that have not been pre-trained from historical data to the set of data frames, including the first data frame and the second data frame, to generate, for at least the first host of the plurality of hosts based on the first data frame and the second data frame, a plurality of estimates that the first host is an outlier relative to other hosts in the plurality of hosts, wherein applying the plurality of machine learning models includes generating a plurality of output values for each data frame including at least a first set of output values generated by applying two or more machine learning models to the first data frame and a second set of output values generated by applying the two or more machine learning models to the second data frame, wherein the two or more machine learning models include different types of machine learning models;
generating, based on the plurality of estimates for the first host of the plurality of hosts, a score representing a likelihood that the first host is exhibiting anomalous behavior, wherein generating the score includes (a) computing a first aggregate value by aggregating the first set of output values generated by applying the two or more machine learning models to the first data frame, (b) computing a second aggregate value by aggregating the second set of output values generated by applying the two or more machine learning models to the second data frame, and (c) computing the score by aggregating at least the first aggregate value and the second aggregate value; and
performing one or more actions based on the score.

20. A method comprising:
generating a set of data frames based on metric values associated with a plurality of hosts detected at a particular point in time, wherein generating the set of data frames comprises generating a first data frame that captures relative changes in different metric values between the particular point in time and a previous point in time for at least a first host of the plurality of hosts and a second data frame that captures absolute changes in the different metric values between the particular point in time and the previous point in time for at least the first host of the plurality of hosts;
applying a plurality of machine learning models that have not been pre-trained from historical data to the set of data frames, including the first data frame and the second data frame, to generate, for at least the first host of the plurality of hosts based on the first data frame and the second data frame, a plurality of estimates that the first host is an outlier relative to other hosts in the plurality of hosts, wherein applying the plurality of machine learning models includes generating a plurality of output values for each data frame including at least a first set of output values generated by applying two or more machine learning models to the first data frame and a second set of output values generated by applying the two or more machine learning models to the second data frame, wherein the two or more machine learning models include different types of machine learning models;
generating, based on the plurality of estimates for the first host of the plurality of hosts, a score representing a likelihood that the first host is exhibiting anomalous behavior, wherein generating the score includes (a) computing a first aggregate value by aggregating the first set of output values generated by applying the two or more machine learning models to the first data frame, (b) computing a second aggregate value by aggregating the second set of output values generated by applying the two or more machine learning models to the second data frame, and (c) computing the score by aggregating at least the first aggregate value and the second aggregate value; and
performing one or more actions based on the score.

* * * * *